United States Patent
Kahani

(10) Patent No.: US 9,475,189 B2
(45) Date of Patent: Oct. 25, 2016

(54) MULTI-ROBOT CROP HARVESTING MACHINE

(71) Applicant: FFMH-Tech Ltd., Benei Dror (IL)

(72) Inventor: Avi Kahani, Benei Dror (IL)

(73) Assignee: FFMH-TECH LTD., Benei Dror (IL)

( * ) Notice: Subject to any disclaimer, the term of this patent is extended or adjusted under 35 U.S.C. 154(b) by 0 days.

(21) Appl. No.: 14/628,258

(22) Filed: Feb. 22, 2015

(65) Prior Publication Data

US 2016/0243696 A1  Aug. 25, 2016

(51) Int. Cl.
  *G05B 19/418* (2006.01)
  *B25J 9/00* (2006.01)
  *A01D 46/30* (2006.01)
  *B25J 9/16* (2006.01)
  *G06T 7/00* (2006.01)
  *G06T 7/40* (2006.01)

(52) U.S. Cl.
  CPC ........... *B25J 9/0084* (2013.01); *A01D 46/30* (2013.01); *B25J 9/1612* (2013.01); *B25J 9/1697* (2013.01); *G06T 7/0004* (2013.01); *G06T 7/408* (2013.01); *G06T 2207/30128* (2013.01); *G06T 2207/30188* (2013.01); *Y10S 901/09* (2013.01)

(58) Field of Classification Search
  CPC ...... A01D 46/24; A01D 46/30; A01D 46/26; A01D 45/006; A01D 75/00; A01D 91/00; G05D 1/021; Y10S 901/014
  USPC .............................. 700/245–248, 259; 901/9
  See application file for complete search history.

(56) References Cited

U.S. PATENT DOCUMENTS

| | | | |
|---|---|---|---|
| 3,646,741 A | | 3/1972 | Edwards et al. |
| 4,519,193 A | * | 5/1985 | Yoshida ............ A01D 46/24 348/89 |
| 4,663,925 A | * | 5/1987 | Terada ............. A01D 46/24 382/153 |
| 4,975,016 A | * | 12/1990 | Pellenc ........... A01D 46/24 294/185 |
| 5,544,474 A | * | 8/1996 | Finkelstein ........ A01D 46/30 56/10.2 A |
| 5,946,896 A | * | 9/1999 | Daniels ............ A01D 46/264 56/328.1 |

(Continued)

FOREIGN PATENT DOCUMENTS

| | | |
|---|---|---|
| DE | 4116728 A1 | 12/1991 |
| JP | 2008206438 A | 9/2008 |

(Continued)

OTHER PUBLICATIONS

Meccanica Zucal, "Model Z11", 12 pages, Jan. 12, 2013.

(Continued)

*Primary Examiner* — Jerrah Edwards
*Assistant Examiner* — Rachid Bendidi
(74) *Attorney, Agent, or Firm* — D. Kliger IP Services Ltd.

(57) ABSTRACT

A harvesting system includes multiple robots, one or more sensors and one or more computers. The robots are mounted on a common frame facing an area to be harvested, and are each configured to harvest crop items by reaching and gripping the crop items from a fixed angle of approach. The sensors are configured to acquire images of the area. The computers are configured to identify the crop items in the images, and to direct the robots to harvest the identified crop items.

22 Claims, 4 Drawing Sheets

(56) References Cited

U.S. PATENT DOCUMENTS

| | | | |
|---|---|---|---|
| 7,765,780 B2* | 8/2010 | Koselka | A01D 46/30 56/10.2 A |
| 7,882,686 B2 | 2/2011 | Bryan, Jr. et al. | |
| 2005/0126144 A1 | 6/2005 | Koselka et al. | |
| 2006/0213167 A1* | 9/2006 | Koselka | A01D 46/30 56/10.2 A |
| 2008/0010961 A1* | 1/2008 | Gray | A01D 46/30 56/10.2 A |
| 2011/0022231 A1* | 1/2011 | Walker | A01D 46/264 700/259 |
| 2013/0204437 A1* | 8/2013 | Koselka | A01D 46/30 700/259 |

FOREIGN PATENT DOCUMENTS

| | | |
|---|---|---|
| WO | 2006013593 A1 | 2/2006 |
| WO | 2006063314 A2 | 6/2006 |

OTHER PUBLICATIONS

English, J., "Robotic Mass Removal of Citrus Fruit", Energid Technologies, 12 pages, Apr. 3, 2012.

Sarig, Y., "Robotics of Fruit Harvesting: A State-of the-art Review," Journal of Agricultural Engineering Research, vol. 54, pp. 265-280, year 1993.

Peterson et al., "A Systems Approach to Robotic Bulk Harvesting of Apples," Transactions of the American Society of Agricultural Engineers, vol. 42, issue 4, pp. 871-876, year 1999.

Baeten et al., "Autonomous Fruit Picking Machine: A Robotic Apple Harvester," 6th International Conference on Field and Service Robotics—FSR 2007, 10 pages, Chamonix, France, Jul. 2007.

Scarfe et al., "Development of an Autonomous Kiwifruit Picking Robot," Proceedings of the 4th International Conference on Autonomous Robots and Agents, 5 pages, Feb. 10-12, 2009.

De-An et al., "Design and Control of an Apple Harvesting Robot," Biosystems Engineering, vol. 110, issue 2, pp. 112-122, Oct. 2011.

Kapach et al., "Computer vision for fruit harvesting robots—State of the art and challenges ahead," International Journal on Computational Vision and Robotics, vol. 3, Nos. 1/2, pp. 4-34, year 2012.

Nguyen et al., "Optimum Detaching Movement for Apples-Harvesting Robot", CIGR-AgEng 2012—International Conference of Agricultural Engineering: Agriculture and Engineering for a Healthier Life, Valencia, Spain, 6 pages, Jul. 8-12, 2012.

Kataoka et al., "Development of a harvesting hand for apples", Advanced Robotics, vol. 13, No. 3, pp. 293-294, year 1999.

Guo et al., "Design and Control of the Open Apple-Picking-Robot Manipulator", 3rd IEEE International Conference on Computer Science and Information Technology, pp. 5-8, Jul. 9-11, 2010.

Zhaoxiang et al., "Apple maturity discrimination and positioning system in an apple harvesting robot", New Zealand Journal of Agricultural Research, vol. 50, pp. 1103-1113, year 2007.

Setiawan et al., "A Low-Cost Gripper for an Apple Picking Robot", Proceedings of the 2004 IEEE International Conference on Robotics & Automation, pp. 4448-4453, Apr. 2004.

Bachche et al., "Design, Modeling and Performance Testing of End-Effector for Sweet Pepper Harvesting Robot Hand", Journal of Robotics and Mechatronics, vol. 25, No. 4, pp. 705-717, year 2013.

Miller et al., "Performance of Mechanical Thinners for Bloom or Green Fruit Thinning in Peaches", HortScience, vol. 45, No. 1, pp. 43-51, year 2011.

Ellis, K., "Developments in Technology and Automation for Tree Fruit", Presentation 29 pages, Dec. 21, 2009 http://www.slideshare.net/CASCrop/developments-in-technology-and-automationfor-tree-fruit.

International Application # PCT/IB2016/050778 Search Report dated May 29, 2016.

* cited by examiner

MULTI-ROBOT CROP HARVESTING MACHINE

FIELD OF THE INVENTION

The present invention relates generally to agricultural machinery, and particularly to agricultural robots.

BACKGROUND OF THE INVENTION

Agricultural operations such as fruit harvesting traditionally involve intensive manual labor. Nevertheless, various solutions for automating these operations have been proposed. For example, Sarig provides a review of several fruit-picking robotics solutions, in "Robotics of Fruit Harvesting: A State-of-the-art Review," Journal of Agricultural Engineering Research, volume 54, 1993, which is incorporated herein by reference. U.S. Pat. No. 3,646,741, whose disclosure is incorporated herein by reference, describes a crop harvesting apparatus that is particularly suited for picking of tree-borne crops such as fruit and nuts.

Peterson et al. describe a robotic bulk apple harvester, in "A Systems Approach to Robotic Bulk Harvesting of Apples," Transactions of the American Society of Agricultural Engineers, volume 42, issue 4, 1999, which is incorporated herein by reference. PCT International Publication WO 2006/063314, whose disclosure is incorporated herein by reference, describes an agricultural robot system for harvesting, pruning, culling, weeding, measuring and managing of agricultural crops.

Beaten et al. describe an autonomous fruit picking machine, in "Autonomous Fruit Picking Machine: A Robotic Apple Harvester," 6$^{th}$ International Conference on Field and Service Robotics—FSR 2007, Chamonix, France, 2007, which is incorporated herein by reference. Scarfe et al. describe a kiwifruit-picking robot, in "Development of an Autonomous Kiwifruit Picking Robot," Proceedings of the 4$^{th}$ International Conference on Autonomous Robots and Agents, February, 2009, which is incorporated herein by reference.

U.S. Pat. No. 7,765,780, whose disclosure is incorporated herein by reference, describes a robot that maps a field to determine plant locations, number and size of fruit on plants and approximate positions of fruit on each plant, and can then plan and implement an efficient picking plan for itself or another robot. De-An et al. describe a robotic device consisting of a manipulator, end-effector and image-based vision servo control system for harvesting apples, in "Design and Control of an Apple Harvesting Robot," Biosystems Engineering, volume 110, 2011, which is incorporated herein by reference.

A mass-removal approach for harvesting is proposed by Energid Technologies (Cambridge, Mass.) in "Robotic Mass Removal of Citrus Fruit," April, 2012, which is incorporated herein by reference.

SUMMARY OF THE INVENTION

An embodiment of the present invention that is described herein provides a harvesting system including multiple robots, one or more sensors and one or more computers. The robots are mounted on a common frame facing an area to be harvested, and are each configured to harvest crop items by reaching and gripping the crop items from a fixed angle of approach. The sensors are configured to acquire images of the area. The computers are configured to identify the crop items in the images, and to direct the robots to harvest the identified crop items.

In some embodiments, the robots are assigned to harvest the crop items in respective different spatial sectors of the area. In an embodiment, the spatial sectors are divided into at least first and second interleaved subsets, and the robots are assigned to harvest the crop items in the first subset when the system is positioned at a first position, and to harvest the crop items in the second subset when the system is re-positioned to a second position. In another embodiment, the robots include respective arms fitted with grippers that are configured to approach and grip the crop items, and the arms of at least a subset of the robots are parallel to one another, such that the angle of approach is common to the robots in the subset.

In yet another embodiment, the computers are configured to direct a given robot to approach a crop item only upon concluding, based on the images, that the given robot is expected to grip the crop item successfully from the fixed angle of approach. In still another embodiment, the computers are configured to identify in the images a cluster of two or more crop items, to specify, based on the images, an order in which the crop items in the cluster are to be harvested, and to direct a given robot to harvest the crop items in the cluster in accordance with the specified order.

In some embodiments, the computers are configured to distinguish, based on the images, between crop items that are suitable for harvesting and crop items that are unsuitable for harvesting, and to direct the robots to harvest only the suitable crop items. In an embodiment, the suitable crop items include undamaged crop items, and the unsuitable crop items include damaged crop items.

In other embodiments, the computers are configured to evaluate a criterion that detects completion of harvesting in a current position of the system, and to initiate re-positioning of the system when the criterion is met. The criterion may depend on at least one of a remaining quantity of the crop items in the current position, and a number of the robots that are idle in the current position.

In a disclosed embodiment, the computers are configured to set the angle of approach depending on a crop type of the crop items. In another embodiment, the computers are configured to iteratively re-acquire the images, re-identify the crop items and update direction of the robots to harvest the re-identified crop items. In yet another embodiment, the computers are configured to synchronize activation of the robots, so as not to exceed an available physical resource of the system. The physical resource may include at least one of electrical power, pneumatic pressure and computational power.

There is additionally provided, in accordance with an embodiment of the present invention, a method for harvesting, including acquiring images of an area to be harvested. Crop items are identified in the images. The identified crop items are harvested using multiple robots that are mounted on a common frame facing the area, and are each configured to reach and grip the crop items from a fixed angle of approach.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for automatic harvesting. In some embodiments, a harvesting system comprises multiple robots, one or more sensors such as cameras, and one or more computers. The robots are mounted on a common frame facing a tree or other area to be harvested. Each robot is typically assigned a respective spatial sector, and is configured to reach, grip and harvest crop items within its designated sector. The sensors acquire images of the area, and the computers identify crop items in the images and direct the robots to harvest the identified crop items. Various suitable crop items, such as different types of fruit and vegetables, can be harvested efficiently in this manner.

In some embodiments the robots comprise simple and low-cost robots having three degrees-of-freedom. Such robots are configured to approach and grip the crop items from a single fixed direction of approach. The relative simplicity of the robots is exploited and complemented by the software executed by the computers, to provide an overall low-cost, high-performance harvesting system. In alternative embodiments, any other suitable robot type can be used.

For example, conventional thought would dictate that in order to grip a crop item successfully, the robots must select the angle of approach per individual crop item. A solution of this sort, however, mandates the use of complex, expensive robots having six degrees-of-freedom. In embodiments of the present invention, on the other hand, the computers thus analyze the images, and select crop items that are expected to be gripped successfully from the fixed angle of approach of the robots. The robots are directed to harvest only the selected crop items, and not waste resources on gripping attempts that are likely to fail. This solution uses the fact that in most cases it is permissible to leave a certain percentage of the crop un-harvested due to price-performance calculations.

Various additional techniques for controlling and directing the multiple robots of the system are described herein. The disclosed system provides a fast, accurate and cost-efficient automatic harvesting solution, which requires minimal human involvement.

System Description

Figure 1:
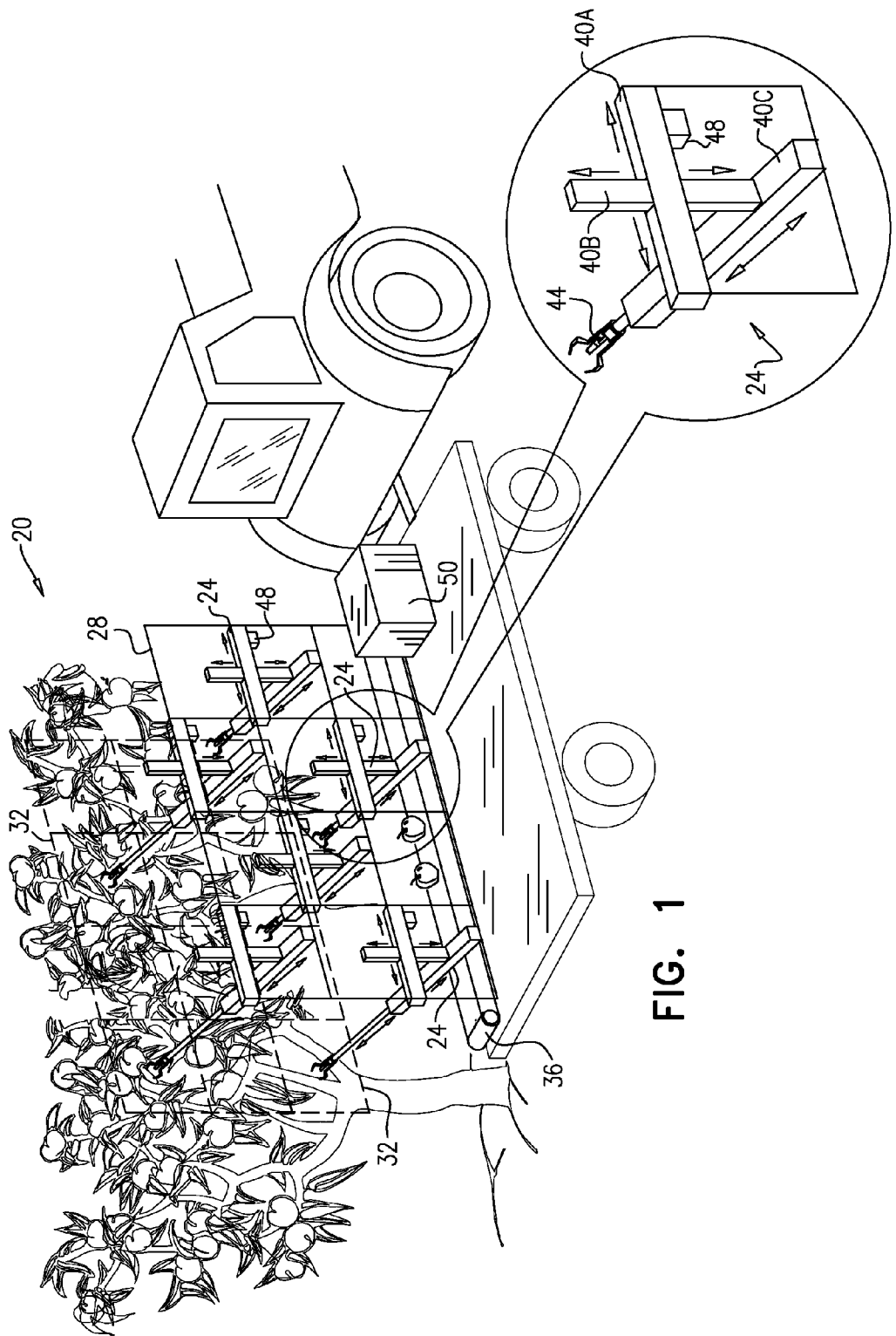
FIG. 1 is a schematic, pictorial illustration of a system for automatic harvesting, in accordance with an embodiment of the present invention.

FIG. 1 is a schematic, pictorial illustration of a system 20 for automatic harvesting, in accordance with an embodiment of the present invention. System 20 can be used for harvesting various types of crops, e.g., fruit such as apples or citrus fruit, or various types of vegetables. In the present context, the term "harvesting" is used broadly and refers to any operation that involves removal of crop items, including, for example, picking, thinning and/or culling.

The description that follows refers mainly to fruit picking, for the sake of clarity. The disclosed techniques, however, can be used in a similar manner for performing any other type of harvesting. Additionally or alternatively, the disclosed techniques can be used, mutatis mutandis, for performing other agricultural operations such as pruning, weeding, spraying and/or pruning.

System 20 comprises multiple robots 24 that are mounted on a common frame 28, facing an area to be harvested. In the present example, system 20 is positioned facing one or more trees to be picked. Frame 28 is typically mounted on a suitable vehicle, e.g., a platform drawn by a tractor.

In a given position of system 20, the area to be harvested is typically divided into multiple sectors 32, and each robot 24 is assigned to harvest crop items in a respective sector. Typically, each robot 24 operates in its designated sector independently of the other robots.

In the present example, only a subset of the sectors are harvested in any given position of the system. In order to harvest the remaining sectors, the system moves forward by one sector. This solution is shown in greater detail in FIGS. 4A and 4B, and is useful, for example, for preventing adjacent robots from colliding with one another.

During operation, robots 24 pick crop items and place them on a conveyor 36. The conveyor transfers the crop items for further processing, e.g., sorting or storage (not shown in the figure). System 20 further comprises an electronics unit 50, which comprises one or more computers (also referred to herein as processors) that control and direct robots 24. The electronics unit may also comprise additional units such as power supplies.

The enlarged section at the bottom-right of the figure shows one of robots 24 in greater detail. Robot 24 comprises three arms 40A, 40B and 40C that move along three respective axes. The directions of motion of the arms are marked by arrows in the figure. The robot arms may be moved using electrical motors, using pneumatic pressure, using a combination of the two, or using any other suitable means. Arms 40A, 40B and 40C are not necessarily orthogonal to one another. In some embodiments, arms 40A and 40B are orthogonal to each other, but the angle between arms 40B and 40C is not necessarily 90° and may be configurable.

A suitable gripper 44 is attached to the distal end of arm 40C. The design of gripper 44 typically depends on the specific crop type to be picked. When using the robot configuration shown in FIG. 1, each robot 24 is capable of reaching and gripping crop items from a fixed angle of approach. The angle of approach is defined as the angle, relative to the plane of the platform carrying system 20, at which arm 40C approaches the crop items.

System 20 further comprises one or more sensors that acquire images of the harvesting areas. In the present example the sensors comprise cameras 48, such as Red-Green-Blue (RGB), monochrome, Near Infrared (NIR) or other Infrared (IR), thermal, or other suitable type of cameras. Alternatively, the sensors may comprise other types of sensors, such as laser scanners. The outputs produced by the sensors are referred to generally as images. The exact structure and content of the images depends on the type of sensors used. The description that follows refers mainly to cameras, for the sake of clarity.

As will be explained below, the images are provided to the computers in unit 50, and the computers analyze the images, identify crop items and possibly other objects, and direct robots 24 accordingly. In the present example, each robot 24 is coupled with a respective camera 48 that acquires images of the sector assigned to that robot. Generally, however, there need not necessarily be a one-to-one relationship between the robots and cameras.

The configuration of system 20 shown in FIG. 1 is an example configuration, which is depicted purely for the sake of conceptual clarity. In alternative embodiments, any other suitable system configuration can be used. For example, the system may use any other suitable type of robot, possibly having three or more degrees-of-freedom, not necessarily the type of robots shown in FIG. 1.

In an embodiment, grippers 44 may be detachable and replaceable. In such embodiments, the same system 20 can be used for harvesting different crop types, and/or for performing different harvesting or other agricultural operations, by suitable choice of grippers and suitable configuration of algorithm per crop type and/or agricultural operation.

In some embodiments, system 20 may comprise two frames 28 having two sets of robots 24 that are mounted back-to-back on opposite sides of the platform. Such a configuration can be used for simultaneous harvesting of trees in adjacent rows, e.g., rows separated by ~4 m.

In an example embodiment, the system may comprise any suitable number of robots 24, arranged in any suitable number of rows and columns. In one embodiment, the harvested area in a given position of system 20 comprises a rectangle of 4 m width and 2.85 m height that begins at a height of 0.35 m above ground. This rectangle is divided into forty sectors, each 0.5 m-by-0.5 m in size. Every second sector is assigned a robot 24 in frame 28. Frame 28 is typically positioned 0.3 m away from the tree front, in which case the robot grippers are capable of reaching into the trees up to a depth of 0.8 m. These numerical values, however, are given purely by way of example, and any other suitable values can be used in alternative embodiments.

In a typical scenario, relating to picking of apples, the trees are planted at intervals of 1-1.5 m. Every tree carries 150-200 fruit per side. Approximately 80% of the fruit are located at heights between 0.5-2 m above ground, approximately 10% are located below 0.5 m, and approximately 10% are located above 2 m. In this scenario, each robot of system 20 is expected to pick one fruit per five seconds. A ten-robot system 20 is expected to be able to pick fruit at a rate of approximately 7,000 fruit per hour, i.e., approximately two fruit per second. Alternatively, however, system 20 may operate in any other suitable scenario.

Figure 2:
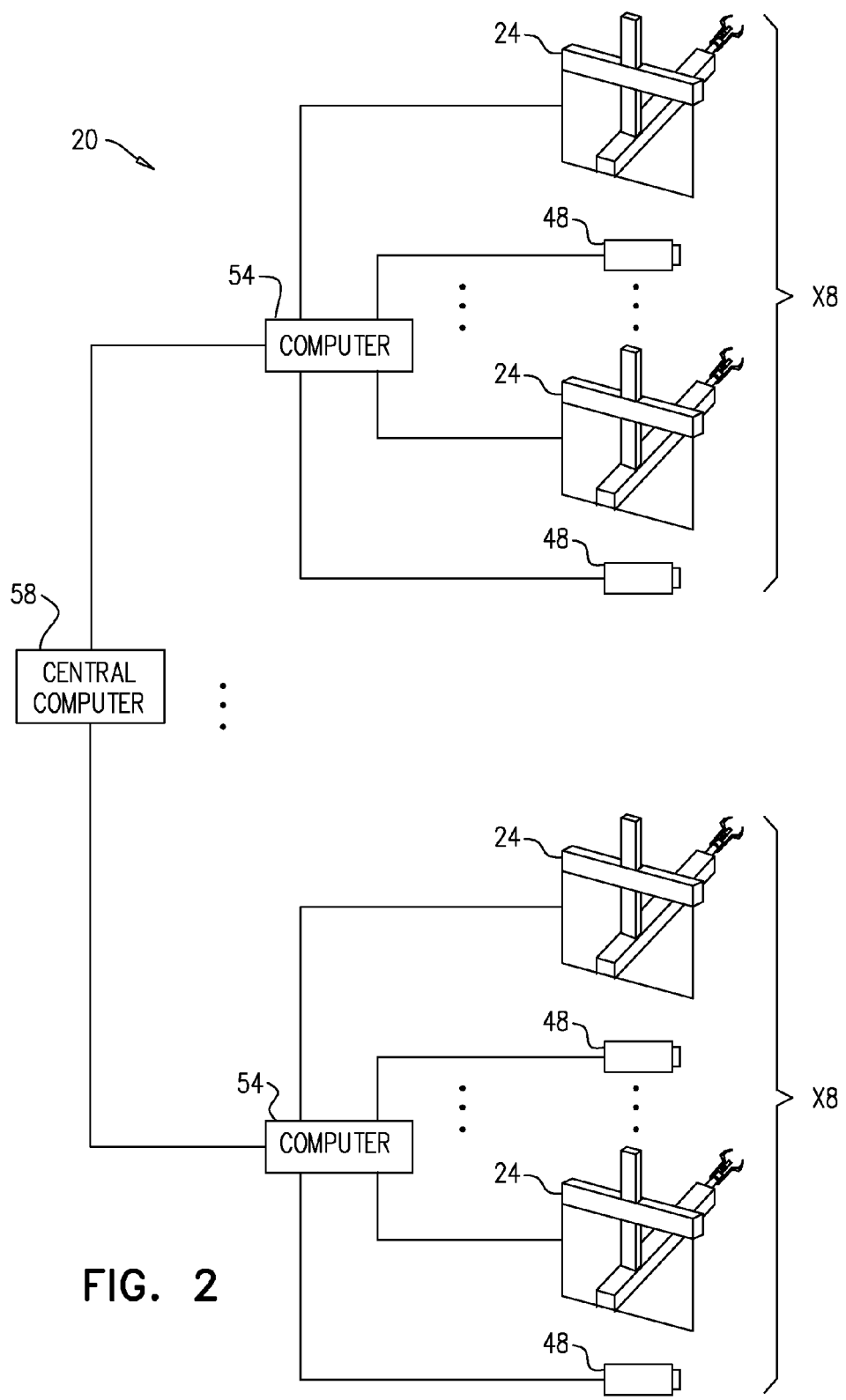
FIG. 2 is a block diagram that schematically illustrates a system for automatic harvesting, in accordance with an embodiment of the present invention.

FIG. 2 is a block diagram that schematically illustrates system 20, in accordance with an embodiment of the present invention. In some embodiments, system 20 comprises one or more types of computers, also referred to as processors or controllers, which run different types of software. The software may comprise, for example, image processing software for analyzing the images provided by cameras 48, control software for controlling robots 24, management software for managing the various system elements, user-interface software for interacting with human users, and/or any other suitable type of software. In an example embodiment, the various software types may run under some operating system, such as the Robotic Operating System (ROS).

In the present example, robots 24 and cameras 48 are divided into groups, e.g., groups of eight robots and respective cameras. The robots and cameras of each group are controlled by a respective group computer 54. Each camera 48 acquires images of the sector assigned to its corresponding robot 24, and transfers the images to the group computer. The group computer analyzes the images and directs the corresponding robot accordingly. As will be explained below, this process is often iterative. During harvesting, cameras 48 re-acquire images, and the computers analyze the new images and direct the robots to continue the harvesting process.

A central computer 58 controls the various group computers 54, and manages the operation of system 20 in general. Such a hierarchical control scheme, however, is not mandatory. In alternative embodiments, system 20 may comprise any other suitable configuration of computers, or even a single computer.

Typically, computers 54 and 58 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Efficient Harvesting Using Multiple Three-Degrees-of-Freedom Robots

Figure 3:
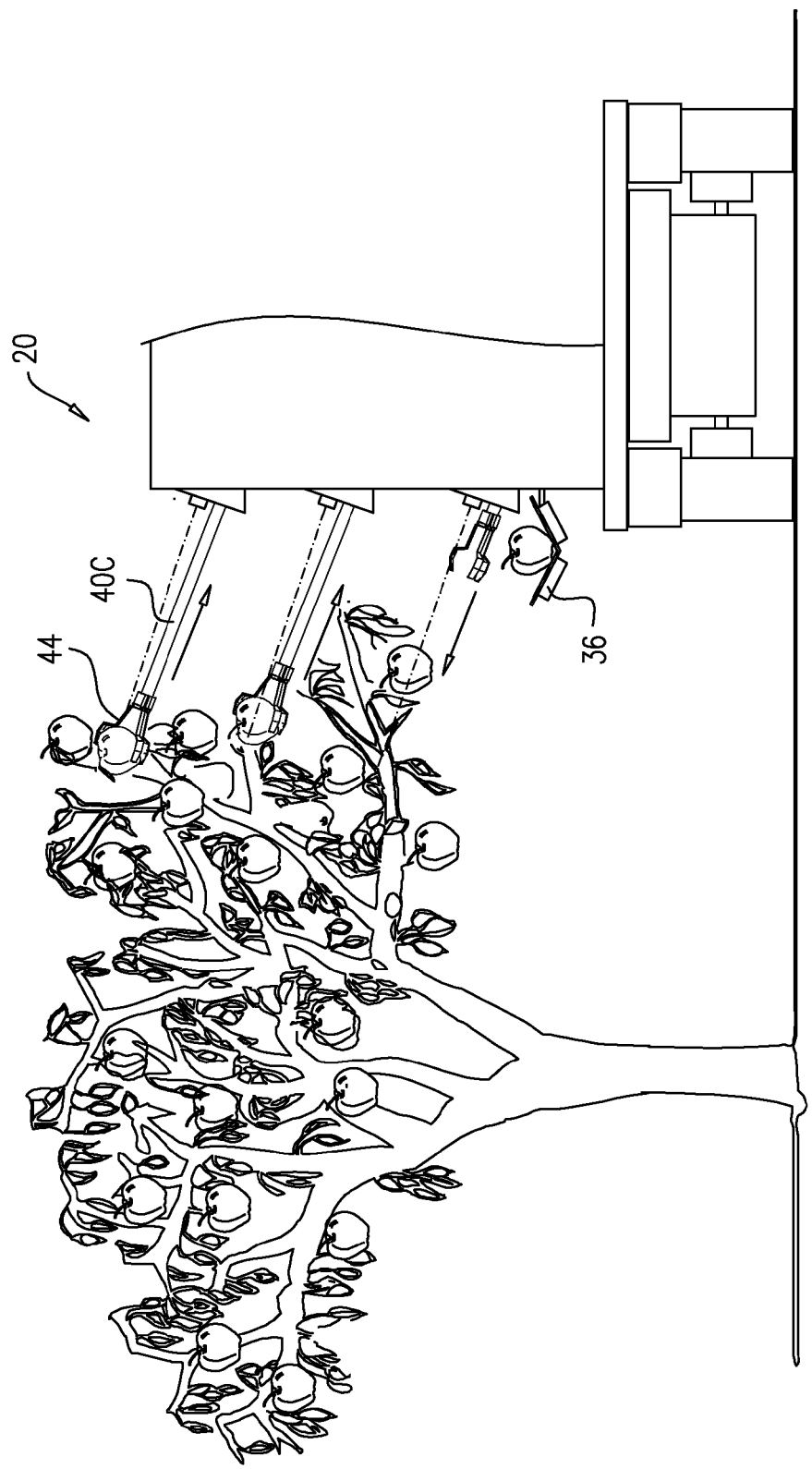
FIG. 3 is a schematic side view of a system for automatic harvesting, in accordance with an embodiment of the present invention.

FIG. 3 is a schematic side view of system 20, in accordance with an embodiment of the present invention. This view shows arms 40C and grippers 44 of robots 24 as they pick fruit and position them onto conveyer 36.

In the present example, arms 40C of all robots 24 are parallel to one another, i.e., all the robots in the system reach and grip the fruit from the same fixed angle of approach. In the present example the fixed angle of approach is 30°, but any other suitable angle can be used in alternative embodiments.

In other embodiments, the angle of approach is fixed per robot, but different robots in the system may be configured with different angles of approach. For example, the robots in one row of frame 28 may be configured with a certain angle of approach, and the robots in another row of frame 28 may be configured with a different angle of approach.

In other embodiments, the angle of approach is set depending on the type of crop, since different crops may have different optimal angles of approach.

The configuration of the angle of approach is typically performed by computers 54 and/or computer 48. In some embodiments, the angle of approach is configured by setting the angle between arms 40B and 40C.

Figure 4A:
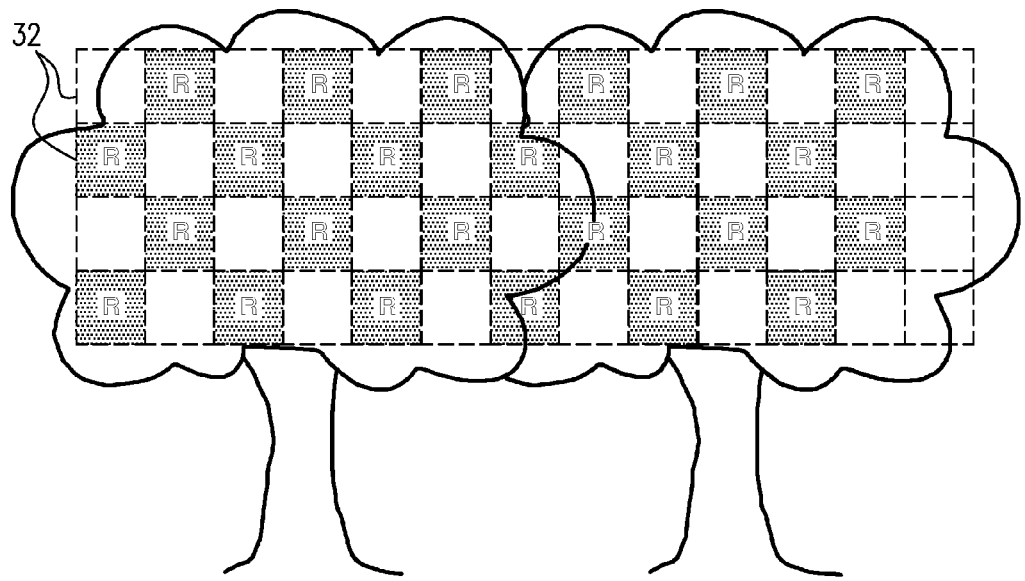
FIGS. 4A and 4B are diagrams that schematically illustrate a pattern of harvesting sectors, in accordance with an embodiment of the present invention.
Figure 4B:
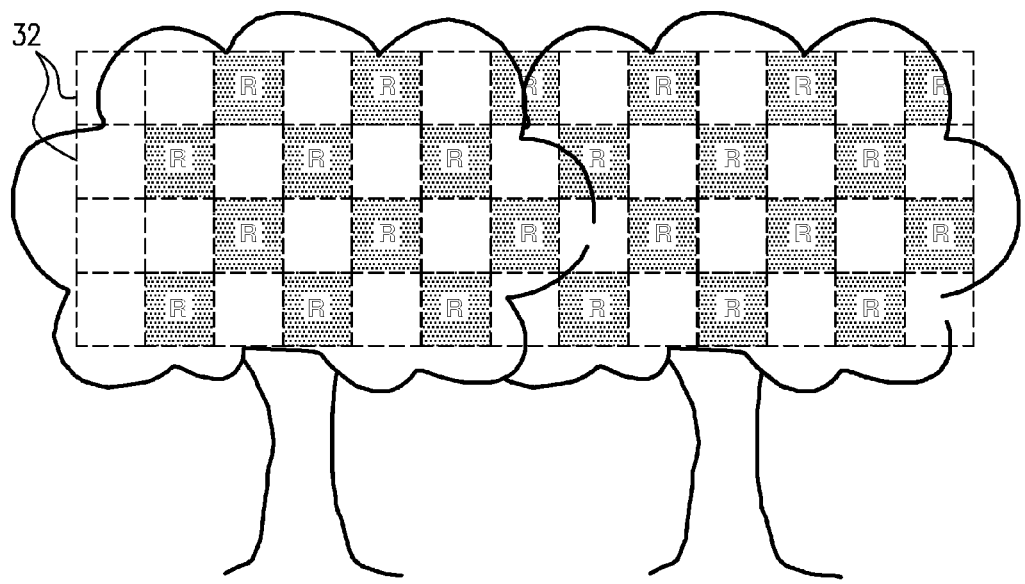

FIGS. 4A and 4B are diagrams that schematically illustrate a pattern of harvesting sectors 32 used by system 20, in accordance with an embodiment of the present invention. FIG. 4A shows the pattern of sectors 32 used when system 20 is positioned in a given position. The sectors marked "R" are assigned to respective robots, and the blank sectors are not harvested at this position.

At a certain point in time, e.g., when harvesting at this position is considered complete, system 20 moves one sector forward (to the right according to the figure) and re-positions at the position of FIG. 4B. At this position, the robots now face the sectors that were not harvested in the previous position.

The harvesting scheme of FIGS. 4A and 4B uses the arrangement of robots 24 in frame 28 shows in FIG. 1, in which adjacent robots are separated by a non-harvested sector. This arrangement simplifies the management of system 20, because robot arms cannot collide with one another, and there is no need to coordinate the movements of adjacent robots.

In alternative embodiments, the harvested area may be divided into any other suitable patterns or subsets of sectors.

For example, the first and last columns in FIGS. 4A and 4B may be fully populated with robots.

Example Software & Control Features

In some embodiments, computers 54 and 58 run suitable software that processes the images acquired by cameras 48, identify crop items and/or other objects in the images, and direct robots 24 to harvest the crop items accordingly. Any suitable machine vision or image processing methods can be used to identify crop items in the images and estimate their location coordinates, in order to direct the robots. Example techniques that can be used for this purpose are described by Kapach et al., in "Computer vision for fruit harvesting robots—State of the art and challenges ahead," International Journal on Computational Vision and Robotics, Volume 3, Nos. 1/2, 2012, which is incorporated herein by reference.

Some of the software features make use of the fact that robots 24 have a fixed angle of approach to the crop items. In the description that follows, computers 54 and 58 are referred to collectively as computers. The software functions can be divided among the various computers in any suitable way.

For example, when analyzing a given sector, the computers may identify the crop items that are expected to be gripped successfully from the fixed angle of approach of the robot of that sector. The robot is directed to harvest only these selected crop items, and not waste time and energy on attempts that are likely to fail.

In many practical scenarios, crop items are arranged in clusters of two or more items. In an embodiment, the computers identify a cluster in the images of a given sector, and define an order in which the crop items in the cluster should be harvested from the fixed angle of approach. Typically, the crop item closest to the robot will be harvested first, and so on. The computers direct the robot of the sector to harvest the crop items in accordance with this order.

In practice, the arrangement of crop items and other objects in a sector may change over time. For example, harvesting of a crop item may reveal another crop item that was hidden before, change the location of a crop item, or drop a crop item. Thus, when harvesting a given sector, the computers typically perform an iterative process that re-acquires images of the sector, re-identifies the crop items, and updates the direction of the robots to harvest the re-identified crop items.

In some embodiments, the computers to distinguish, based on the images, between crop items that are suitable for harvesting and crop items that are unsuitable for harvesting in accordance with some predefined criterion. The computers direct the robots to harvest only the suitable crop items and ignore the unsuitable items.

The computers may consider various criteria for distinguishing between suitable and unsuitable crop items. In one embodiment, the computers distinguish between damaged and undamaged crop items, and direct the robots to harvest the undamaged items and skip the damaged items. Damage may comprise, for example, bird damage or any other suitable damage that can be identified by analyzing the images.

In another embodiment, the computers distinguish between ripe and unripe crop items, e.g., on the basis of differences in color, differences in size, differences in shape, or any other suitable difference. Such differences may also be used for selective harvesting in general, not necessarily for distinguishing between ripe and unripe crop items.

In some embodiments, the computers evaluate a completion criterion, which detects completion of harvesting in the current position of system 20. Upon detecting that the criterion is met, the computers may indicate this fact to a user, or initiate re-positioning of system 20 in any other suitable way.

Various completion criteria can be used. For example, the computers may identify in the images that the quantity (e.g., number or percentage) of remaining crop items falls below a threshold. As another example, the computers may detect that the number of robots that are still actively harvesting is below a threshold. In other words, the computers may identify that at least a predefined number of robots have completed harvesting their sectors and are currently idle. Any such criterion can be used for triggering a move to a new position.

In some embodiments, the computers synchronize the activation of robots 24, so as to regulate the consumption of physical system resources such as electrical power, pneumatic pressure or computing power. Typically, each robot consumes physical resources in bursts. For example, the robot electricity or pneumatic pressure consumption may be maximal when the robot arms are in full acceleration. At other times, the consumption is typically much lower. In some practical cases, however, system 20 is unable to supply the maximum resource consumption simultaneously to a large number of robots.

Thus, in some embodiments the computers control the relative timing in which the robots are activated, in order to avoid high consumption peaks. For example, the computers may predict the instantaneous overall resource consumption (e.g., electrical power, air volume or computational load). If the predicted instantaneous consumption exceeds a threshold, the computers may delay activation of one or more of the robots, or alternatively instruct one or more robots to move with reduced acceleration.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A harvesting system, comprising:
a frame, which is configured to move between multiple positions along a row of trees to be harvested;
multiple robots, which comprise movable robot arms and which are mounted on the frame facing a respective area to be harvested at a first position of the frame, wherein the robot arms are fitted with grippers that are configured to approach and grip the crop items, and each of the robots is configured to harvest crop items by reaching and gripping the crop items using the grippers from a respective angle of approach of the robot arm that is fixed for that robot, and wherein the robot arms of at least a subset of the robots are parallel to one another such that the angle of approach is common to the robots in the subset;

one or more sensors, which are all fixed relative to the frame and do not move with the robot arms, and which are configured to acquire images of the area only from outside the trees; and one or more computers, which are configured to identify the crop items in the images acquired by the sensors fixed relative to the frame, and to direct the robots to harvest the identified crop items, wherein the row of trees is divided into multiple spatial sectors, wherein each of the robots is configured to harvest the crop items in a respective spatial sector that is surrounded by unassigned spatial sectors that are not harvested at the first position of the frame, and, upon moving the frame along the row of trees from the first position to a second position, to harvest the crop items in one of the spatial sectors that were unassigned at the first position.

2. The system according to claim 1, wherein the computers are configured to direct a given robot to approach a crop item only upon concluding, based on the images, that the given robot is expected to grip the crop item successfully from the fixed angle of approach.

3. The system according to claim 1, wherein the computers are configured to identify in the images a cluster of two or more crop items, to specify, based on the images, an order in which the crop items in the cluster are to be harvested, and to direct a given robot to harvest the crop items in the cluster in accordance with the specified order.

4. The system according to claim 1, wherein the computers are configured to distinguish, based on the images, between crop items that are suitable for harvesting and crop items that are unsuitable for harvesting, and to direct the robots to harvest only the suitable crop items.

5. The system according to claim 4, wherein the suitable crop items comprise undamaged crop items, and the unsuitable crop items comprise damaged crop items.

6. The system according to claim 1, wherein the computers are configured to evaluate a criterion that detects completion of harvesting in the first position of the frame, and to initiate re-positioning of the system when the criterion is met.

7. The system according to claim 6, wherein the criterion depends on at least one of a remaining quantity of the crop items in the first position, and a number of the robots that are idle in the first position.

8. The system according to claim 1, wherein the computers are configured to set the angle of approach depending on a crop type of the crop items.

9. The system according to claim 1, wherein the computers are configured to iteratively re-acquire the images, re-identify the crop items and update direction of the robots to harvest the re-identified crop items.

10. The system according to claim 1, wherein the computers are configured to synchronize activation of the robots, so as not to exceed an available physical resource of the system.

11. The system according to claim 10, wherein the physical resource comprises at least one of electrical power, pneumatic pressure and computational power.

12. A method for harvesting, comprising:

moving a frame, having multiple robots mounted thereon, between multiple positions along a row of trees, so that, at each position of the frame, wherein the robots comprise movable robot arms and face a respective area to be harvested, and wherein the robot arms are fitted with grippers that are configured to approach and grip the crop items;

acquiring images of the area to be harvested, wherein the images are acquired only from outside the trees, using one or more sensors that are fixed relative to the frame and do not move with the robot arms;

using one or more computers, identifying crop items in the images acquired by the sensors fixed relative to the frame; and using the one or more computers, directing the multiple robots to harvest the identified crop items by reaching and gripping the crop items by the grippers of each robot from a respective angle of approach of the robot arm that is fixed for that robot, wherein the robot arms of at least a subset of the robots are parallel to one another such that the angle of approach is common to the robots in the subset, wherein the row of trees is divided into multiple spatial sectors, wherein each of the robots is configured to harvest the crop items in a respective spatial sector that is surrounded by unassigned spatial sectors that are not harvested at the first position of the frame, and, upon moving the frame along the row of trees from the first position to a second position, to harvest the crop items in one of the spatial sectors that were unassigned at the first position.

13. The method according to claim 12, wherein identifying and harvesting the crop items comprise directing a given robot to approach a crop item only upon concluding, based on the images, that the given robot is expected to grip the crop item successfully from the fixed angle of approach.

14. The method according to claim 12, wherein identifying the crop items comprises identifying in the images a cluster of two or more crop items, and wherein harvesting the crop items comprises specifying, based on the images, an order in which the crop items in the cluster are to be harvested, and directing a given robot to harvest the crop items in the cluster in accordance with the specified order.

15. The method according to claim 12, wherein identifying the crop items comprises distinguishing, based on the images, between crop items that are suitable for harvesting and crop items that are unsuitable for harvesting, and wherein harvesting the crop items comprises directing the robots to harvest only the suitable crop items.

16. The method according to claim 15, wherein the suitable crop items comprise undamaged crop items, and the unsuitable crop items comprise damaged crop items.

17. The method according to claim 12, wherein harvesting the crop items comprises evaluating a criterion that detects completion of harvesting in the first position of the robots, and initiating re-positioning of the robots when the criterion is met.

18. The method according to claim 17, wherein the criterion depends on at least one of a remaining quantity of the crop items in the first position, and a number of the robots that are idle in the first position.

19. The method according to claim 12, wherein harvesting the crop items comprises setting the angle of approach depending on a crop type of the crop items.

20. The method according to claim 12, wherein harvesting the crop items comprises iteratively re-acquiring the images, re-identifying the crop items and updating direction of the robots to harvest the re-identified crop items.

21. The method according to claim 12, wherein harvesting the crop items comprises synchronizing activation of the robots, so as not to exceed an available physical resource.

22. The method according to claim 21, wherein the physical resource comprises at least one of electrical power, pneumatic pressure and computational power.

* * * * *